United States Patent
Choi et al.

(10) Patent No.: US 11,595,648 B2
(45) Date of Patent: Feb. 28, 2023

(54) METHOD AND SYSTEM FOR SINGLE LOOP MULTILAYER CODING WITH SUBPICTURE PARTITIONING

(71) Applicant: Tencent America LLC, Palo Alto, CA (US)

(72) Inventors: Byeongdoo Choi, Vancouver, WA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/562,749

(22) Filed: Dec. 27, 2021

(65) Prior Publication Data

US 2022/0124328 A1    Apr. 21, 2022

Related U.S. Application Data (63) Continuation of application No. 17/026,310, filed on Sep. 21, 2020, now Pat. No. 11,245,899.
(Continued)

(51) Int. Cl.
*H04N 19/119* (2014.01)
*H04N 19/46* (2014.01)
(Continued)

(52) U.S. Cl.
CPC ......... *H04N 19/119* (2014.11); *H04N 19/136* (2014.11); *H04N 19/1883* (2014.11); *H04N 19/46* (2014.11)

(58) Field of Classification Search
USPC .................................................. 375/240.02
See application file for complete search history.

(56) References Cited

U.S. PATENT DOCUMENTS

| | | | | |
|---|---|---|---|---|
| 2007/0230564 | A1* | 10/2007 | Chen | H04N 19/61 375/E7.199 |
| 2014/0301463 | A1* | 10/2014 | Rusanovskyy | H04N 19/52 375/240.16 |

(Continued)

OTHER PUBLICATIONS

Benjamin Bross et al., "Versatile Video Coding (Draft 6)," Joint Video Experts Team (JVET) of ITU-T SG 16 WP 3 and ISO/IEC JTC 1/SC 29IWG 11, Jul. 2019, JVET-O2001-vE. 455 pages.

*Primary Examiner* — Behrooz M Senfi
(74) *Attorney, Agent, or Firm* — Anova Law Group PLLC (57) ABSTRACT

A versatile video coding (VVC) method includes obtaining a plurality of video sources; encoding the plurality of video sources into a bitstream including a plurality of independent layers corresponding to the plurality of video sources; generating signaling information on the plurality of independent layers and integrating the signaling information with the bitstream; and transferring the bitstream for decoding processing, wherein the signaling information is to be used in the decoding process to enable a single decoder instance to decode the plurality of independent layers similar to a single-layer bitstream. The signaling information includes at least a video parameter set (VPS), and the VPS includes a flag inbl_one_pic_per_poc_flag equal to 1, which specifies that the bitstream contains independent layers and there is one and only one coded picture with a particular picture order count (POC) value in a same coded video sequence (CVS) among all layers.

20 Claims, 5 Drawing Sheets

Related U.S. Application Data

(60) Provisional application No. 62/947,245, filed on Dec. 12, 2019, provisional application No. 62/906,077, filed on Sep. 25, 2019, provisional application No. 62/903,869, filed on Sep. 22, 2019.

(51) Int. Cl.
*H04N 19/169* (2014.01)
*H04N 19/136* (2014.01)

(56) References Cited

U.S. PATENT DOCUMENTS

| | | |
|---|---|---|
| 2015/0264370 A1* | 9/2015 | Ramasubramonian ............... H04N 19/167 375/240.02 |
| 2015/0358640 A1* | 12/2015 | Hendry .................. H04N 19/61 375/240.13 |
| 2020/0186795 A1 | 6/2020 | Wang et al. |
| 2021/0092358 A1 | 3/2021 | Choi et al. |
| 2021/0092359 A1 | 3/2021 | Nassor et al. |
| 2021/0092406 A1 | 3/2021 | Seregin et al. |
| 2021/0092426 A1 | 3/2021 | Choi et al. |
| 2021/0092446 A1 | 3/2021 | Choi et al. |
| 2021/0092448 A1 | 3/2021 | Choi et al. |
| 2021/0092451 A1 | 3/2021 | Choi et al. |
| 2021/0105496 A1 | 4/2021 | Choi et al. |
| 2022/0239949 A1* | 7/2022 | Hannuksela ......... H04N 19/105 |

* cited by examiner

This application is a continuation application of U.S. patent application Ser. No. 17/026,310 filed on Sep. 21, 2020, which in turn claims priority to U.S. provisional patent application No. 62/903,869, filed on Sep. 22, 2019; U.S. provisional patent application No. 62/906,077, filed on Sep. 25, 2019; and U.S. provisional patent application No. 62/947,245, filed on Dec. 12, 2019, content of all of which is incorporated by reference in their entirety.

FIELD OF THE TECHNOLOGY

This application relates to the field of versatile video coding technologies and, specifically, to a method and system for single loop multilayer coding with subpicture partitioning.

BACKGROUND

Versatile Video Coding (VVC), also known as H.266, MPEG-I Part 3 and Future Video Coding (FVC), is a developing video compression standard. In October 2015, the MPEG and VCEG formed the Joint Video Exploration Team (WET) to evaluate available compression technologies and study the requirements for a next-generation video compression standard. The VVC standard is still developing, and new features and improvements still need to be added.

Under current coding standard, when a single layer bitstream is partitioned into multiple subpictures, it is often difficult to handle bitstream merge and extractions of subpictures. Instead, if a layer represents a subpicture and multi-layers are contained into a bitstream, it is easy to handle subpicture merge and extraction. Then, the entire or partial picture can be composed by one or more layers at decoder side. However, multi-layered bitstreams usually need multi-DPB models and need multiple decoder instances. The disclosed methods and systems are directed to solve one or more problems set forth above and other problems.

SUMMARY

One aspect of the present disclosure includes a versatile video coding (VVC) method. The method includes obtaining a plurality of video sources; encoding the plurality of video sources into a bitstream including a plurality of independent layers corresponding to the plurality of video sources; generating signaling information on the plurality of independent layers and integrating the signaling information with the bitstream; and transferring the bitstream for decoding processing, wherein the signaling information is to be used in the decoding process to enable a single decoder instance to decode the plurality of independent layers similar to a single-layer bitstream. The signaling information includes at least a video parameter set (VPS), and the VPS includes: a parameter vps_max_layers_minus1 greater than 0, which specifies a number of the plurality of independent layers; a flag vps_all_independent_layers_flag equal to 1, which specifies that the plurality of independent layers specified by the VPS are independently coded; and a flag inbl_one_pic_per_poc_flag equal to 1, which specifies that the bitstream contains independent layers and there is one and only one coded picture with a particular picture order count (POC) value in a same coded video sequence (CVS) among all layers, and indicates that a profile-tier-level and hypothetical-reference-decoder (HRD) parameters apply collectively to the plurality of independent layers.

Another aspect of the present disclosure includes a versatile video coding (VVC) method. The method includes obtaining a video bitstream of a plurality of video sources. The video bitstream includes a plurality of independent layers corresponding to the plurality of video sources, and signaling information on the plurality of independent layers integrated with the bitstream. The method also includes decoding the video bitstream by using a single decoder instance to decode the plurality of independent layers similar to a single-layer bitstream, based on the signaling information, to generate decoded output video contents integrating the plurality of video sources; and rendering the decoded output video contents using the signaling information. The signaling information includes at least a video parameter set (VPS), and the VPS includes: a parameter vps_max_layers_minus1 greater than 0, which specifies a number of the plurality of independent layers; a flag vps_all_independent_layers_flag equal to 1, which specifies that the plurality of independent layers specified by the VPS are independently coded; and a flag inbl_one_pic_per_poc_flag equal to 1, which specifies that the bitstream contains independent layers and there is one and only one coded picture with a particular picture order count (POC) value in a same coded video sequence (CVS) among all layers, and indicates that a profile-tier-level and hypothetical-reference-decoder (HRD) parameters apply collectively to the plurality of independent layers.

Other aspects of the present disclosure can be understood by those skilled in the art in light of the description, the claims, and the drawings of the present disclosure.

DETAILED DESCRIPTION

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure.

Certain acronyms and terms used in this disclosure are listed as follows. Other acronyms and/or terms not listed may be found from a VVC standard or other related documents.

CVS: coded video sequences

HRD: hypothetical reference decoder

NAL: network abstraction layer

POC: picture order count

PPS: picture parameter set

RBSP: raw byte sequence payload

RPL: reference picture list

RPS: reference picture set

SPS: sequence parameter set

VVC: versatile video coding

VCL: video coding layer

VPS: video parameter set

Bitstream: A sequence of bits, in the form of a NAL unit stream or a byte stream, that forms the representation of coded pictures and associated data forming one or more CVS.

VVC standard: A currently published version (e.g., JVET-R2001) of the Specification of VVC, which is incorporated herein by reference.

Chroma: An adjective, represented by the symbols Cb and Cr, specifying that a sample array or single sample is representing one of the two color difference signals related to the primary colors.

Coded picture: A coded representation of a picture comprising VCL NAL units with a particular value of nuh_layer_id within an access unit and containing all CTUs of the picture.

Coding tree block (CTB): An N×N block of samples for some value of N such that the division of a component into CTBs is a partitioning.

Coding tree unit (CTU): A CTB of luma samples, two corresponding CTBs of chroma samples of a picture that has three sample arrays, or a CTB of samples of a monochrome picture or a picture that is coded using three separate colour planes and syntax structures used to code the samples.

Flag: A variable or single-bit syntax element that can take one of the two possible values: 0 and 1.

Layer: A set of VCL NAL units that all have a particular value of nuh_layer_id and the associated non-VCL NAL units.

Layer access unit: A set of NAL units for which the VCL NAL units all have a particular value of nuh_layer_id, that are associated with each other according to a specified classification rule, that are consecutive in decoding order, and that contain exactly one coded picture.

Level: A defined set of constraints on the values that may be taken by the syntax elements and variables of this Specification, or the value of a transform coefficient prior to scaling.

Subpicture: An rectangular region of one or more slices within a picture.

Supplemental enhancement information (SEI) message: A syntax structure with specified semantics that conveys information that is not needed by the decoding process in order to determine the values of the samples in decoded pictures.

Syntax element: An element of data represented in the bitstream.

Syntax structure: Zero or more syntax elements present together in the bitstream in a specified order.

Figure 1:
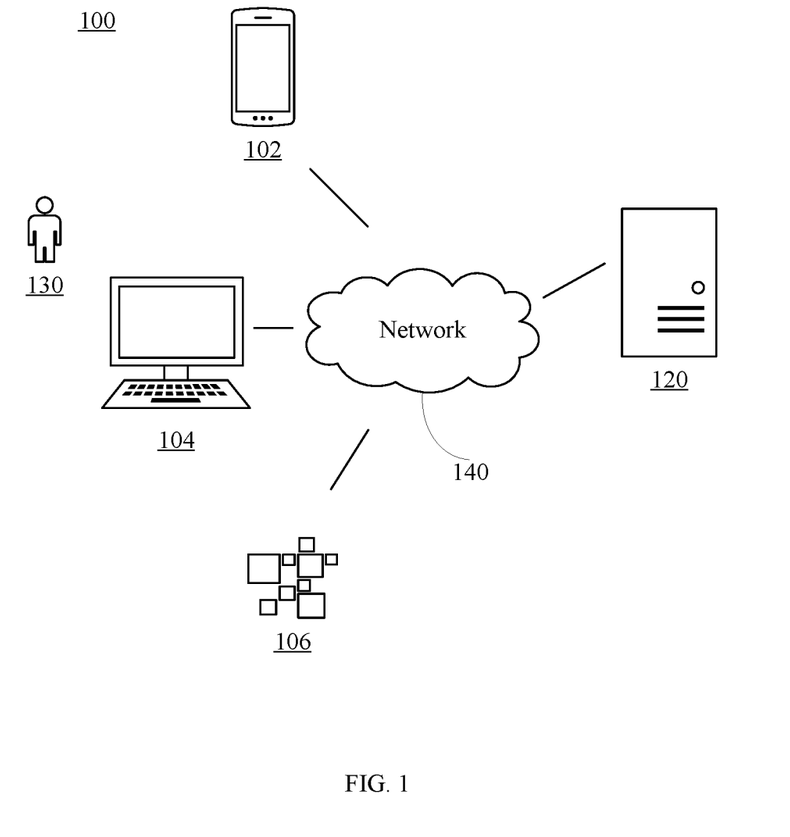
FIG. 1 illustrates an operating environment incorporating certain embodiments of the present disclosure.

FIG. 1 shows an operating environment 100 incorporating certain embodiments of the present disclosure. As shown in FIG. 1, the operating environment 100 may include a variety of devices with video functionalities. For example, the operating environment 100 may include a mobile device 102, a terminal device 104, and an electronic device 106. Other types of devices may also be included.

The operating environment 100 may also include a server 120, one or more users 130, and a communication network 140 connecting the variety of devices and the server 120. The user(s) 130 may use, access, or control one or more of the variety of devices.

The mobile device 102, the terminal device 104, and the electronic device 106 may be generally referred as a terminal device, which may include any user terminal, such as a personal digital assistant (PDA), a mobile phone, a smart phone, an integrated messaging device (IMD), a tablet computer, a notebook computer, a desktop computer, and other computing devices. The terminal device may also include any image or video capturing devices, such as a digital camera, a video camera, a security camera, a vehicle on-board camera, and a stereo camera, etc., or any electronic device with a video function, such as a digital doorbell, an autonomous driving sensor, a digital voice assistant, a smart speaker, a smart appliance, or any industrial or commercial IoT systems with video processing capability. Any of the mobile device 102, terminal device 104, and electronic device 106 may be stationary or mobile when carried by an individual who is moving, and may also be located as a part or in a mode of transport including a car, a truck, a taxi, a bus, a train, a boat, an airplane, a bicycle, a motorcycle or any similar suitable mode of transport.

The network 140 may include any appropriate type of communication network and may comprise any combination of wired or wireless networks including, but not limited to a wireless cellular telephone network, a wireless local area network (WLAN), a Bluetooth personal area network, an Ethernet local area network, a token ring local area network, a wide area network, and the Internet. The network 140 may also include private or public cloud computing platform for voice/data communication. When the Internet or other type of network is included, connectivity to the Internet may include long range wireless connections, short range wireless connections, and various wired connections including telephone lines, cable lines, power lines, and similar communication pathways.

The server 120 may include any type of server computer system or multiple computer systems configured in a server cluster or distributed in different locations. The server 120 may also include a cloud server on a cloud computing platform. The server 120 may also be referred as a server entity, which may be integrated with any appropriate device (including the electronic device) for performing the disclosed server-side functionalities of video decoding and application processing.

Figure 2:
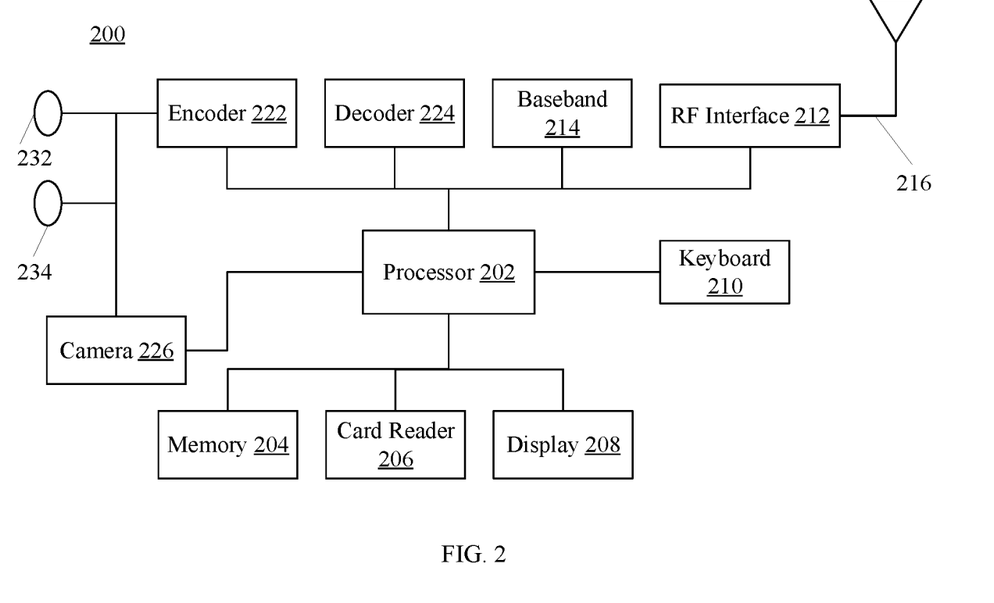
FIG. 2 illustrates a computer system consistent with embodiments of the present disclosure.

FIG. 2 illustrates an exemplary computer system implementing certain aspects of the variety of terminal devices 102, 104, and/or 106, and/or server 120. As shown in FIG. 2, the computer system 200 may include a hardware processor 202, a memory 204, a card reader 206, a display 208, a keyboard 210, a radio-frequency (RF) interface 212, a baseband 214, an antenna 216, an encoder 222, a decoder 224, a camera 226, a speaker 232, and a microphone 234, etc. The components shown in FIG. 2 are illustrative, certain components may be omitted, and other components may be added.

The processor 202 may be provided for controlling the computer system 200. The processor 202 may be connected to other components through one or more bus or other electrical connections to send data to and receive data from the other components. The processor 202 may include one or more processing cores, for example, a 4-core processor or an 8-core processor. The processor 202 may be implemented by using at least one hardware form of digital signal processing (DSP), a field-programmable gate array (FPGA), and a programmable logic array (PLA). The processor 202 may also include a main processor and a coprocessor. The main processor may be a central processing unit (CPU), and the coprocessor may be a graphics processing unit (GPU) configured to be responsible for rendering and drawing content that a display screen needs to display. In some embodiments, the processor 202 may further include an artificial intelligence (AI) processor. The AI processor is configured to process a computing operation related to machine learning.

The memory 204 may include one or more computer-readable storage media, such as a high-speed random access memory and a nonvolatile memory, for example, one or more disk storage devices or flash storage devices. The memory 204 may store both data in the form of image and audio data and may also store instructions for the processor 202. The card reader 206 may include any type of portable card interface, such as a smart card interface, a communication card interface (e.g., near field communication (NFC) card), or a subscriber identifier module (SIM) card or other card interface for providing user information and being suitable for providing authentication information for authentication and authorization of the user 130.

Further, the display 208 may be any suitable display technology suitable to display an image or video. For example, the display 208 may include a liquid crystal display (LCD) screen, an organic light-emitting diode (OLED) screen, or the like, and may be a touch screen. The keyboard 210 may include a physical or virtual keyboard to input information by the user, and may also include other types of input/output devices. The speaker 232 and the microphone 234 may be used to input and output audio for the computer system 200.

The RF interface 212 (together with the antenna 216) may include RF circuitry for receiving and transmit RF signals. The RF interface 212 may convert an electrical signal to an electromagnetic signal for transmission or convert a received electromagnetic signal into an electrical signal for receiving. The RF interface 212 may communicate with other electronic devices through at least one wireless communication protocol. The wireless communication protocol may include a metropolitan area network, mobile communications networks (2G, 3G, 4G, and 5G) of various generations, a wireless local area network (LAN), and/or a wireless fidelity (WiFi) network. In some embodiments, the RF interface 212 may also include a circuit related to near field communication (NFC). The baseband 214 may include circuitry for processing the signals to and from the RF interface 212.

Further, the camera 226 may include any type of imaging or video capturing device configured to collect an image or a video. When the computer system 200 is a portable device carried by the user, the camera 226 may include a front-facing camera and a rear-facing camera. The front-facing camera may be disposed on the front panel of the electronic device, and the rear-facing camera is disposed on a rear surface of the electronic device. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera 226 may further include a flash.

The encoder 222 and the decoder 224 may be referred as the codec circuitry of the electronic device suitable for carrying out coding and decoding of audio and/or video data or assisting in coding and decoding carried out by the processor 202.

The computer system 200 as shown in FIG. 2 may also include additional structures to implement any particular system. For example, the computer system 200 may include a database, and/or a land-line based network communication interface when implementing the server 120, or may include structures similar to those of a mobile terminal or user equipment of a wireless communication system when implementing the mobile device 102, etc. However, the computer system 200 may include or omit any structure to implement any electronic device or apparatus which may require encoding and decoding, or encoding or decoding video.

Returning to FIG. 1, the computer system 200 (i.e., any one or more of the variety of devices 102, 104, and/or 106) may capture or collect various data (e.g., audio data, environment/operating data, image data, and/or video data) and send the data to the server 120 through the network 140. The computer system 200 may process or pre-process the data before sending the data to the server 120, or may send the unprocessed data to the server 120.

Figure 3:
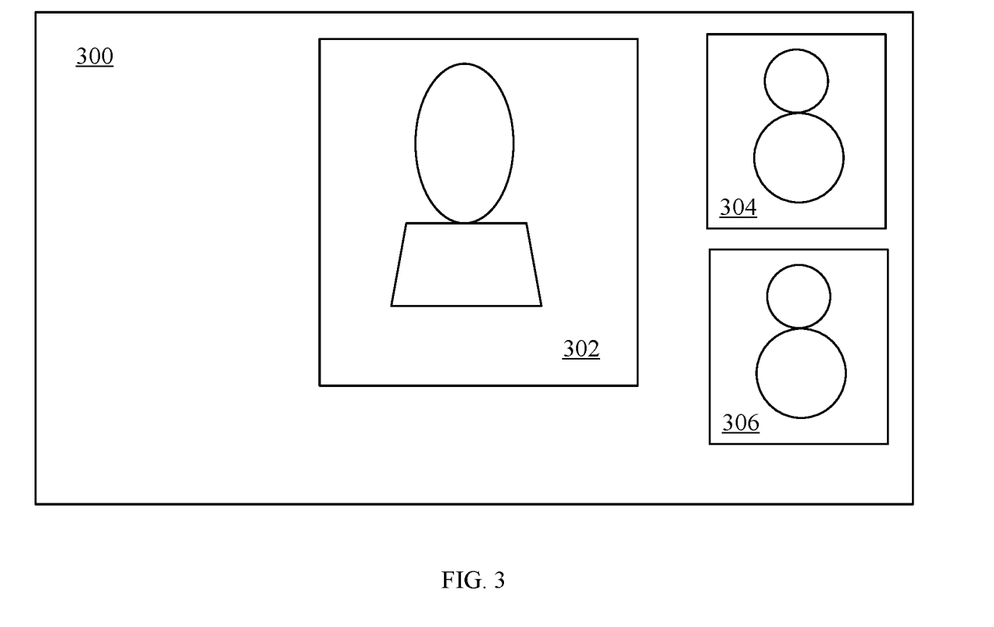
FIG. 3 illustrates a multiple-user video conference interface consistent with embodiments of the present disclosure.

During operation, a user of a terminal device may use a video application to transmit and/or receive video content to and/or from server 120, or users of the various terminal devices may use various video applications to communicate video content with each other. In one embodiment, one user may communicate video content with another user via the server 120, or the server 120 may set up the communication channel between the users, so that one user may direct communicate video with the other user via the communication channel. FIG. 3 illustrates an exemplary multiple-user video conference application consistent with the disclosed embodiments.

As shown in FIG. 3, a multiple-user video conference interface for a user of a terminal device includes a video display 300, a display of a first user 302, a display of a second user 304, and a display of a third user 306. Although FIG. 2 shows a total of three users in the video conference, any number of users may be included.

The first user 302 may be in control of the video conference. For example, the first user 302 may be speaking to other users during the video conference. The second user 304 and the third user 306 may be passive at the moment, such that the displays of the second user 304 and the third user 306 may be at the side of the video display 300, while the display of the active first user 302 may be bigger and at a center portion of the video display 300.

Further, because the video contents/sources for the first user 302, the second user 304, and the third user 306 may be independent, the video display 300 may include multiple independent video content, including its own video content. That is, the video display 300 may be implemented using independent layers to display different regions or subpictures of the video display. For example, the server 120 may encode the various video sources into different independent layers of a bitstream, together with signaling information, and send the bitstream to the terminal device for decoding, rendering, and displaying.

After the terminal device receive the encoded video bitstream with different independent layers, the terminal device may decode the bitstream and display the multiple user displays in a single video display, i.e., integrating the video of the independent layers of the bitstream into a single display of a multiple-user video conference interface. In one embodiment, after the terminal device receives the video content in a bitstream, the terminal device may use a single decoder instance to decode the video content containing multiple independent layers for independent coded regions. Such video decoding process may also be referred to as a single-layer VVC decoding process for decoding multiple independent layers. The decoding is performed as if all NAL units resided in a single layer only.

Figure 4:
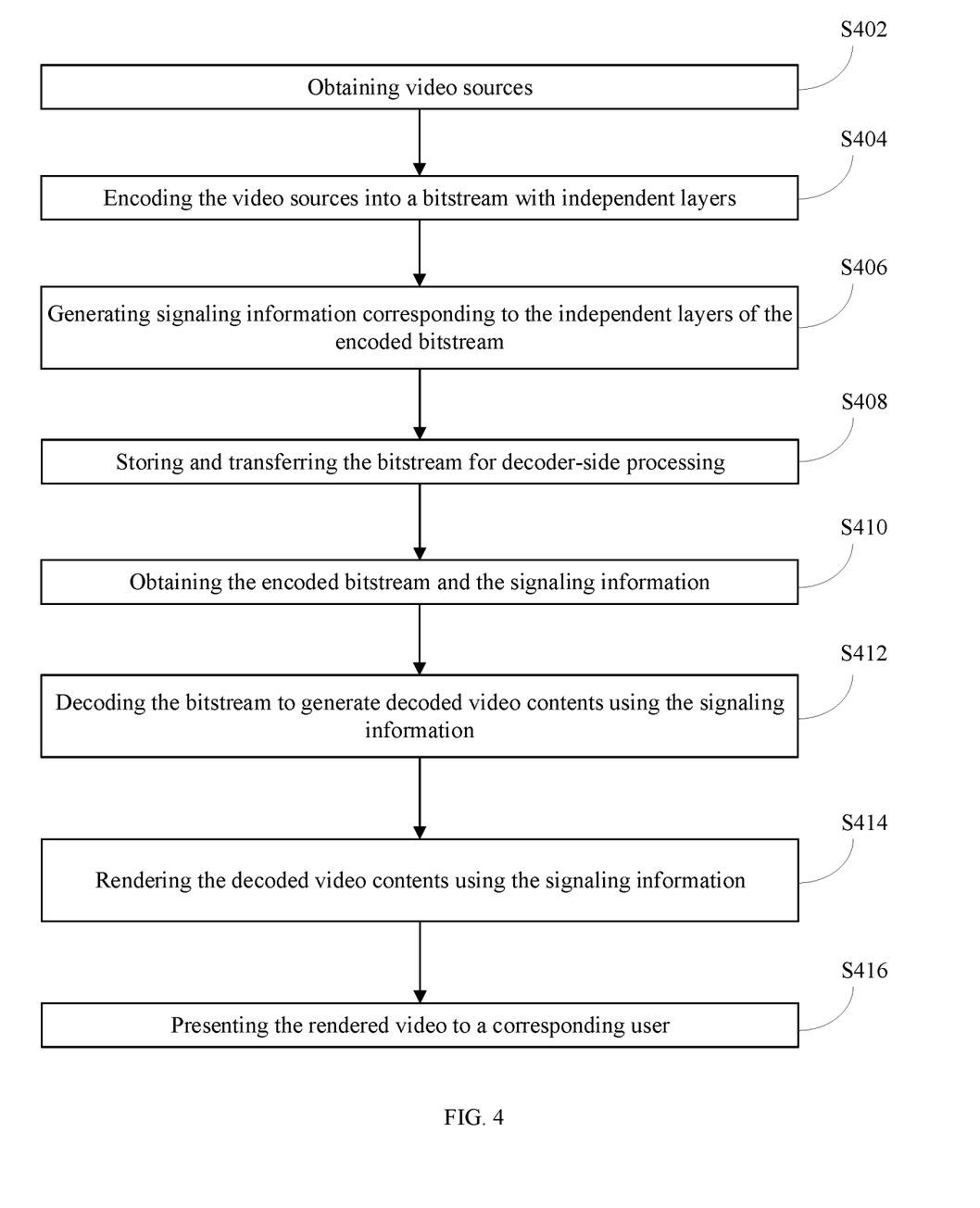
FIG. 4 illustrates an exemplary encoding and decoding process consistent with embodiments of the present disclosure.

More generally, FIG. 4 illustrates a video coding process (e.g., an encoding and/or decoding process) performed by a computer systems (e.g., the processor, a VVC encoder, and/or a VVC decoder) consistent with the disclosed embodiments. As shown in FIG. 4, at the beginning of the process, a plurality of video sources may be obtained (S402).

For example, the computer system (e.g., server 120) may receive a plurality video sources from different devices or users, such as from multiple user cameras or user terminals in a multiple-user video conference application, or from multiple monitoring cameras in a monitoring or security video application, etc.

Further, the computer system may encode the plurality of video sources into an encoded video bitstream with independent layers (S404).

The independent layers may include any types of independent layers, such as "independent coded region" layers, and texture or depth layers, e.g., for 3DoF+. Further, in one embodiment, the terminal device may also decode each independent layer with a separate decoder instance, and may be backward compatible with previous VVC standards.

Figure 5:
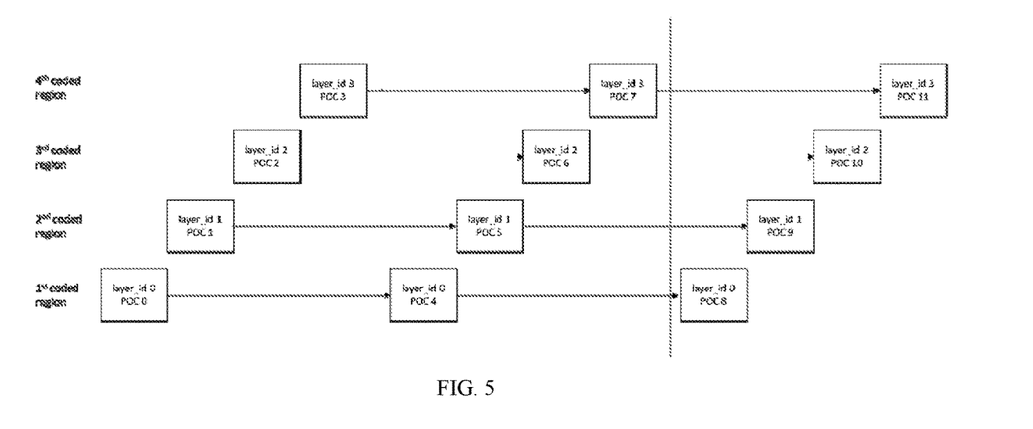
FIG. 5 illustrates an exemplary sequence structure with independently coded region layers consistent with embodiments of the present disclosure.

The encoding may be performed so that picture order count (POC) values differ across layers, i.e., at most one picture is present for a given POC value among all layers. FIG. 5 illustrates an exemplary sequence structure with independently coded region layers. As shown in FIG. 5, the encoder (e.g., the encoder on the server 120) may encode a video content with a total of four (4) independently coded regions into four independent layers in the bitstream, using the POC value.

For example, the encoder may encode a portion of the first coded region into independent layer layer_id 0 and POC 0, a portion of the second coded region into independent layer layer_id 1 and POC 1, a portion of the third coded region into independent layer layer_id 2 and POC 2, and a portion of the fourth coded region into independent layer layer_id 3 and POC 3. Further, the encoder may continue to encode another portion the first coded region into independent layer layer_id 0 and POC 4, another portion of the second coded region into independent layer layer_id 1 and POC 5, another portion of the third coded region into independent layer layer_id 2 and POC 6, and another portion of the fourth coded region into independent layer layer_id 3 and POC 3. The encoder may continue such encoding process until all coded regions are encoded into the independent layers in the bitstream. Further, the encoder may also generate corresponding signaling information to be sent along with the bitstream, such as reference picture list (RPL) signaling information, inter layer reference picture set (RPS) signaling information etc. For example, any prediction structure within an independently coded region layer can be supported by the RPL signaling, based on the POC delta indication. The signaling information may be embedded in the bitstream or may be sent through an out-of-band signaling channel. Any appropriate format of signaling may be used.

One advantage of using such approach is that it enables signalling a single profile-tile-level for decoding all the independent layers with a single decoding process. For example, this enables indicating a single profile-tier-level, e.g., for a bitstream containing texture and depth coded as independent layers.

Further, returning to FIG. 4, the computer system may also generate signaling information corresponding to the independent layers of the encoded bitstream (S406). That is, the computer system or the encoder of the computer system may provide sufficient information and/or processing means for the independent layers of the bitstream to be correctly decoded and rendered.

Within the context of the VVC, the encoding side may introduce a VPS flag (inbl_one_pic_per_poc_flag) to indicate that there is one and only one picture per each POC value among all independent layers and that the independent layers can be decoded as if there were in the same layer.

Further, HRD parameters for the independent layers (i.e., collective HRD parameters) can be signalled for the bitstream that contains multiple independent layers as follows.

(A) When inbl_one_pic_per_poc_flag is equal to 1, the profile-tier-level and the HRD parameters applying collectively to the independent layers are indicated as follows in the VPS: (i) a single profile-tier-level syntax structure that applies to the bitstream (as if there were only a single layer); (ii) parameters max_dec_pic_buffering_minus1, max_num_reorder_pics, and max_latency_increase_plus1 that apply collectively to the bitstream (rather than per layer); and (iii) hrd_parameters( ) that apply to the bitstream.

(B) Independent layer set nesting SEI message is provided for carrying SEI messages that apply collectively to the independent layers of the bitstream. It can be used to carry buffering period and picture timing SEI messages that apply to the bitstream (rather than per layer).

Accordingly, it is possible to control by external means that the entire bitstream is decoded using a single decoder instance as if it were a single-layer bitstream. Otherwise, the layer-wise operation of VVC can be carried out using multiple decoder instances. Both a single decoder instance and multiple decoder instances can be supported cross various terminal devices.

Figure 6:
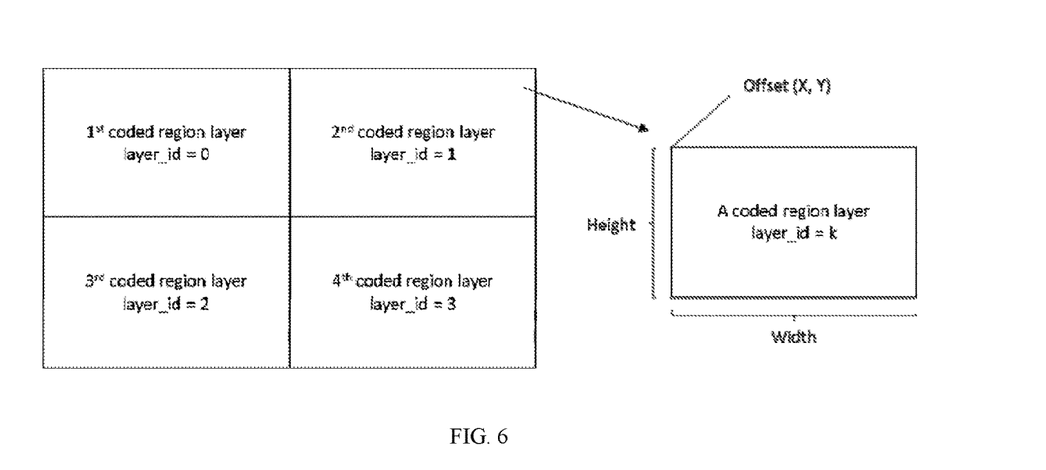
FIG. 6 illustrates an example of independently coded regions with a layer mapping information consistent with embodiments of the present disclosure.

Further, the signaling information may also include certain flags, video parameters and settings based on the specific conditions and configurations. For example, the layout information of independently coded region layers can be signaled in the independently coded region layer SEI (supplemental enhancement information) message. Mapping information to connect each independently coded region to each layer may also be included in the SEI message. FIG. 6 shows an example of independently coded regions with a layer mapping information, and FIG. 7 shows 4-neighbour information of each layer, top, right, bottom and left which constitutes the layout information.

As shown in FIG. 6, a video display includes four independently coded regions encoded into a bitstream with four independent coded region layers, a first coded region layer with layer_id 0, a second coded region layer with layer_id 1, a third coded region layer with layer_id 2, and a fourth coded region layer with layer_id 3. The signaling information may include the offset value (offset (x, y)) of the left-top position and the coded region size (e.g., the height, width, etc.) of each layer.

Figure 7:
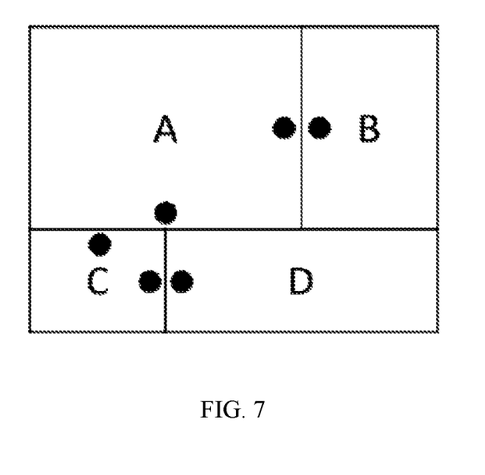
FIG. 7 illustrates 4-neighbour information of each layer of independently coded region layers consistent with embodiments of the present disclosure.

As shown in FIG. 7, additionally or alternatively, the layer mapping information (showing as black dots) may include the 4-neighbour information of each layer of the four independent layers A, B, C, and D, such as top, right, bottom and left which may comprise the layout information.

With the signaling information shown in any of FIG. 6 and FIG. 7, the granularity of the picture size of a layer can be finer than that of the subpicture in the subpicture partitioning approach as a single layer.

Returning to FIG. 4, specifically, the following table 1 shows syntax of corresponding video parameter set (VPS) (i.e., VPS syntax), and these parameters are required to be available for decoding.

The parameter vps_video_parameter_set_id provides an identifier for the VPS for reference by other syntax elements. The value of vps_video_parameter_set_id shall be greater than 0.

The parameter vps_max_layers_minus1 plus 1 specifies the number of layers specified by the VPS, which is the maximum allowed number of layers in each CVS referring to the VPS.

The flag vps_all_independent_layers_flag equal to 1 specifies that all layers specified by the VPS are independently coded without using inter-layer prediction. vps_all_independent_layers_flag equal to 0 specifies that one or more of the layers specified by the VPS may use inter-layer prediction. When not present, the value of vps_all_independent_layers_flag is inferred to be equal to 1.

TABLE 1

VPS syntax

| | Descriptor |
|---|---|
| video_parameter_set_rbsp( ) { | |
|   vps_video_parameter_set_id | u(4) |
|   vps_max_layers_minus1 | u(6) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) | |
|         for( j = 0; j < i; j++ ) | |
|           vps_direct_dependency_flag[ i ][ j ] | u(1) |
|     } | |
|   } | |
|   if( vps_max_layers_minus1 > 0 ) { | |
|     vps_output_layers_mode | u(2) |
|     if( vps_output_layers_mode == 2 ) | |
|       for( i = 0; i < vps_max_layers_minus1; i++ ) | |
|         vps_output_layer_flag[ i ] | u(1) |
|   } | |
|   vps_constraint_info_present_flag | u(1) |
|   vps_reserved_zero_7bits | u(7) |
|   if( vps_constraint_info_present_flag ) | |
|     general_constraint_info( ) | |
|   if( vps_max_layers_minus1 > 0 && vps_all_independent_layers_flag ) { | |
|     inbl_one_pic_per_poc_flag | u(1) |
|     if( inbl_one_pic_per_poc_flag ) { | |
|       inbl_hrd_param_present_flag | u(1) |
|       if( inbl_hrd_param_present_flag ) { | |
|         inbl_num_units_in_tick | u(32) |
|         inbl_time_scale | u(32) |
|       } | |
|       inbl_max_sub_layers_minus1 | u(3) |
|       profile_tier_level( inbl_max_sub_layers_minus1 ) | |
|       inbl_sub_layer_ordering_present_flag | u(1) |
|       for( j = ( inbl_sub_layer_ordering_present_flag ? 0 : inbl_max_sub_layers_minus1 ); | |
|           j <= inbl_max_sub_layers_minus1; j++ ) { | |
|         inbl_max_dec_pic_buffering_minus1[ j ] | ue(v) |
|         inbl_max_num_reorder_pics[ j ] | ue(v) |
|         inbl_max_latency_increase_plus1[ j ] | ue(v) |
|       } | |
|       if( inbl_hrd_param_present_flag ) | |
|         hrd_parameters( inbl_max_sub_layers_minus1 ) | |
|     } | |
|   } | |
|   vps_extension_flag | u(1) |
|   if( vps_extension_flag ) | |
|     while( more_rbsp_data( ) ) | |
|       vps_extension_data_flag | u(1) |
|   rbsp_trailing_bits( ) | |
| } | |

The parameters vps_layer_id[i] specifies the nuh_layer_id value of the i-th layer. For any two non-negative integer values of m and n, when m is less than n, the value of vps_layer_id[m] shall be less than vps_layer_id[n].

The flags vps_independent_layer_flag[i] equal to 1 specifies that the layer with index i does not use inter-layer prediction. vps_independent_layer_flag[i] equal to 0 specifies that the layer with index i may use inter-layer prediction and the syntax elements vps_direct_ref_layer_flag[i][j] for j in the range of 0 to i−1, inclusive, are present in VPS. When not present, the value of vps_independent_layer_flag[i] is inferred to be equal to 1.

The flag vps_extension_flag equal to 0 specifies that no vps_extension_data_flag syntax elements are present in the VPS RB SP syntax structure. vps_extension_flag equal to 1 specifies that there are vps_extension_data_flag syntax elements present in the VPS RBSP syntax structure.

The flag vps_extension_data_flag may have any value.

The flag inbl_one_pic_per_poc_flag equal to 0 specifies that coded pictures at different layers may have the same PicOrderCnt value. ols_one_pic_per_poc_flag equal to 1 specifies that the bitstream consists of independent layers and there is one and only one coded picture with a particular PicOrderCnt value in the same CVS among all layers and the content of all the SPS RBSPs referencing this VPS RBSP is identical except potentially for the content of the profile_tier_level( ), general hrd_parameters( ) and vui_parameters( ) syntax structures contained in the SPS RBSPs.

The flag inbl_hrd_param_present_flag equal to 1 specifies that the syntax elemnts inbl_num_units_in_tick, inbl_time_scale, and the syntax structure hrd_parameters( ) are present in the VPS RBSP syntax structure. inbl_hrd_param_present_flag equal to 0 specifies that the syntax elemnts inbl_num_units_in_tick, inbl_time_scale, and the syntax structure hrd_parameters( ) applying to all independent layers collectively are not present in the VPS RBSP syntax structure.

The parameters inbl_num_units_in_tick and inbl_time_scale are specified identically to num_units_in_tick and time_scale, respectively, and apply to the hrd_parameters( ) present in the VPS and to the buffering period and picture timing SEI messages that are nested within independent layer set nesting SEI message.

The parameter inbl_max_sub_layers_minus1 specifies the maximum number of temporal sub-layers that may be present.

The flag inbl_sub_layer_ordering_present_flag equal to 1 specifies that inbl_max_dec_pic_buffering_minus1 [j], inbl_max_num_reorder_pics[j], and inbl_max_latency_increase_plus[j] are present for inbl_max_sub_layers_minus1+1 sub-layers. inbl_sub_layer_ordering_present_flag equal to 0 specifies that the values of inbl_max_dec_pic_buffering_minus1[inbl_max_sub_layers_minus1], inbl_max_num_reorder_pics[inbl_max_sub_layers_minus1], and inbl_max_latency_increase_plus1[inbl_max_sub_layers_minus1] apply to all sub-layers.

The parameters inbl_max_dec_pic_buffering_minus1[j], inbl_max_num_reorder_pics[j], and inbl_max_latency_increase_plus[j] are specified identically to sps_max_dec_pic_buffering_minus1 [j], sps_max_num_reorder_pics [j], and sps_max_latency_increase_plus1[j], respectively, for a bitstream where all the layers present.

Returning to FIG. 4, after the encoded bitstream is generated (together with the signaling information) (S406), the encoded bistream may be stored and/or transferred for decoder-side processing (S408).

Further, after the computer system (e.g., a terminal device) obtains the encoded bitstream (together with the signaling information) (S410), the computer system or the decoder of the computer system may decode the bitstream using the signaling information to generate decoded video contents (S412).

For example, for the decoding side, in addition to the general decoding process required by the current VVC standard, for each CVS in the bitstream, the variable TargetLayerId, which identifies the target layer to be decoded, and the variable HighestTid, which identifies the highest temporal sub-layer to be decoded, are specified as follows:

If some external means is available to set TargetLayerIdList, TargetLayerIdList is set by the external means.

Otherwise, if vps_all_independent_layers_flag is equal to 1 and some external means is available to indicate that the entire bitstream containing all layers is decoded, DecodeAllLayersAsSingleLayerFlag is set equal to 1.

Otherwise, if vps_all_independent_layers_flag is equal to 1, TargetLayerIdList is set to contain only vps_layer_id[0].

Otherwise, TargetLayerIdList is set to contain vps_layer_id[i] for i in the range of 0 to vps_max_layers_minus1, inclusive.

If some external means is available to set HighestTid, HighestTid is set by the external means.

Otherwise, HighestTid is set equal to sps_max_sub_layers_minus1.

. . .

If TargetLayerIdList is provided by external means or inferred, the following applies:

for each CVS in the bitstream, the sub-bitstream extraction process as specified in clause 10 is applied with the CVS, TargetLayerIdList, and HighestTid as inputs, and the output is assigned to a bitstream referred to as CvsToDecode.

After that, the instances of CvsToDecode of all the CVSs are concatenated, in decoding order, and the result is assigned to the bitstream BitstreamToDecode.

The decoding process (see VVC standard Clause 8.1.2) is repeatedly invoked for each coded picture in BitstreamToDecode in decoding order.

Otherwise (DecodeAllLayersAsSingleLayerFlag is equal to 1), the following applies:

It is a requirement for bitstream conformance that inbl_one_pic_per_poc_flag is equal to 1.

Separate instances of variables starting with an upper case letter are derived and kept for each layer. The decoding process (see VVC standard Clause 8.1.2) is repeatedly invoked for each coded picture in the bitstream in decoding order. The upper case variables pertaining to the nuh_layer_id of the coded picture provided as input to the decoding process are used in the decoding process.

Returning to FIG. 4, after decoding the video bitstream (S412), the computer system may render the decoded video contents based on the decoded video bitstream and the signaling information (S414).

For example, at the decoder side, when an independently coded region layer SEI message is present in the bitstream, the layout information signalled in the SEI message may be used in the rendering process for composition. The composed picture for displaying is constructed by merging one or more output pictures of the independently coded region layers.

That is, for the decoding process for a coded picture, an independently coded region layer SEI message may be used. The independently coded region layer SEI message may provide the location and size information of a independently coded region covered by a layer. When the independently coded region layer SEI message is present, each region in a picture is independently coded in a layer, and the location and size information of a region corresponding to a layer is used for composition of a composed output picture. The composed output picture can be constructred by merging one or more output pictures of the independently coded region layers. Specifically, the table 2 below shows independently coded region layer SEI message syntax.

TABLE 2

| Independently coded region layer SEI message syntax | |
|---|---|
| | Descriptor |
| Iindependent_coded_region_layer_info( payloadSize ) { | |
|     composed_pic_width_in_luma_samples | ue(v) |
|     composed_pic_height_in_luma_samples | ue(v) |
|     num_independent_regions_in_pic_minus1 | ue(v) |
|     layer_id_present_flag | u(1) |
|     for( i = 0; i <= num_independent_regions_in_pic_minus1; i++ ) { | |
|       if( layer_id_present_flag ) | |
|         region_layer_id[ i ] | u(6) |
|       if( i > 0 ){ | |
|         layer_region_offset_x_in_luma_samples[ i ] | ue(v) |
|         layer_region_offset_y_in_luma_samples[ i ] | ue(v) |
|       } | |
|       layer_region_width_in_luma_samples[ i ] | ue(v) |
|       layer_region_height_in_luma_samples[ i ] | ue(v) |
|     } | |
| } | |

The parameters composed_pic_width_in_luma_samples specifies the width of a picture composed by one or more independently coded regions in units of luma samples. composed_pic_width_in_luma_samples shall not be equal to 0 and shall be an integer multiple of MinCbSizeY.

The parameters composed_pic_height_in_luma_samples specifies the height of a picture composed by one or more independently coded regions in units of luma samples. composed_pic_height_in_luma_samples shall not be equal to 0 and shall be an integer multiple of MinCbSizeY.

The parameter num_independent_regions_in_pic_minus1 plus 1 specifies the number of independently coded regions in a picture. The value of num_independent_regions_in_pic_minus1 shall be in the range of 0 to 125, inclusive.

The flag layer_id_present_flag equal to 1 specifies that region_layer_id[i] is present in this SEI message. layer_id_present_flag equal to 0 specifies that region_layer_id[i] is not present in this SEI message.

The parameters region_layer_id[i] specifies the value of NuhLayerId corresponding to the i-th independently coded region. One or more NAL units with nuh_layer_id equal to region_layer_id[i] shall be present in the CVS associated with this SEI message. When not present, the value of region_layer_id[i] is inferred to be equal to i.

The parameters layer_region_offset_x_in_luma_samples [i] specifies the horizontal offset, in units of luma samples, of the top-left corner luma sample of the i-th independently coded region relative to the top-left corner luma sample of the composed picture. When not present, the value of layer_region_offset_x_in_luma_samples[i] is inferred to be equal to 0. layer_region_offset_x_in_luma_samples[i] shall be an integer multiple of MinCbSizeY.

The parameters layer_region_offset_y_in_luma_samples [i] specifies the vertical offset, in units of luma samples, of the top-left corner luma sample of the i-th independently coded region relative to the top-left corner luma sample of the composed picture. When not present, the value of layer_region_offset_y_in_luma_samples[i] is inferred to be equal to 0. layer_region_offset_y_in_luma_samples[i] shall be an integer multiple of MinCbSizeY.

The parameter layer_region_width_in_luma_samples[i] specifies the width of the i-th independently coded region in units of luma samples. The value of layer_region_width_in_luma_samples[i] shall be equal to the value of PicOutputWidthL of the layer with nuh_layer_id_equal_to_region_layer_id[i].

The parameter layer_region_height_in_luma_samples[i] specifies the height of the i-th independently coded region in units of luma samples. The value of layer_region_height_in_luma_samples[i] shall be equal to the value of PicOutputHeightL of the layer with nuh_layer_id_equal_to_region_layer_id[i].

Further, the table 3 below indicates the persistence scope of SEI messages.

TABLE 3

| Persistence scope of SEI messages (informative) | |
|---|---|
| SEI message | Persistence scope |
| Independently coded region layer | The access unit containing the SEI message and up to but not including the next access unit, in decoding order, that contains an SEI message of the same type or starts a new CVS. |

In certain embodiments, additionally or alternatively, the table 4 below shows another independently coded region layer SEI message syntax.

TABLE 4

| Independently coded region layer SEI message syntax | |
|---|---|
| | Descriptor |
| independent_coded_region_layer_info( payloadSize ) { | |
|     boundary_identifier_length_minus1 | ue(v) |
|     boundary_identifier_north | u(v) |

TABLE 4-continued

Independently coded region layer SEI message syntax

| | Descriptor |
|---|---|
| boundary_identifier_east | u(v) |
| boundary_identifier_south | u(v) |
| boundary_identifier_west | u(v) |
| } | |

The parameter boundary_identifier_length_minus1 plus 1 specifies the number of bits used to represent the syntax elements boundary identifier north[i], boundary identifier east[i], boundary identifier south[i] and boundary identifier west[i]. The value of boundary_id_length_minus1 shall be in the range of 0 to 15, inclusive.

The parameters boundary_identifier_north[i], boundary_identifier_east[i], boundary_identifier_south[i], boundary_identifier_west[i] specifies the identifier respecitvely at the north, east, south and west boundary of the decoded picture of the i-th layer within the output picture. The length of the boundary_identifier_north[i], boundary_identifier_east[i], boundary_identifier_south[i], and boundary_identifier_west[i] syntax elements is boundary_id_length_minus1+1 bits.

When the values of the pair boundary_identifier_north[i] and boundary_identifier_south[j] or the values of the pair boundary_identifier_east[i] and boundary_identifier_west[j] are equal the decoded picture of the i-th layer and the decoded picture of the j-th layer are adjacent in the output picture and they share a common boundary respectively at the boundary north/south and east/west. Two decoded pictures adjacent by the north/south boundary are aligned on their west boundary in the output picture. Two decoded pictures adjacent by the east/west boundary are aligned on their north boundary in the output picture.

Further, the table 5 below indicates the persistence scope of SEI messages.

TABLE 5

Persistence scope of SEI messages (informative)

| SEI message | Persistence scope |
|---|---|
| Independently coded region layer | The access unit containing the SEI message and up to but not including the next access unit, in decoding order, that contains an SEI message of the same type or starts a new CVS. |

Further, for the decoding process for a coded picture, an independent layer set nesting SEI message may be used. The independent layer set nesting SEI message may provide a mechanism to associate SEI messages applying collectively to all independent layers of the bitstream. An independent layer set nesting SEI message contains one or more SEI messages. The table 6 below shows independent layer set nesting SEI message syntax.

TABLE 6

Independent layer set nesting SEI message syntax

| | Descriptor |
|---|---|
| inbl_nesting( payloadSize ) { | |
|   while( !byte_aligned( ) ) | |
|     nesting_zero_bit /* equal to 0 */ | u(1) |
|   do | |
|     sei_message( ) | |
|   while( more_rbsp_data( ) ) | |
| } | |

The parameter nesting_zero_bit equal to 0 specifies that nesting SEI message is not present, the non-zero of the nesting_zero_bit specifies the nesting SEI messages.

Further, the table 7 below indicates the persistence scope of nesting SEI messages.

TABLE 7

Persistence scope of SEI messages (informative)

| SEI message | Persistence scope |
|---|---|
| Independent layer set nesting SEI | Depending on the nested SEI messages. Each nested SEI message has the same persistence scope as if the SEI message was not nested. |

In certain embodiments, a subpicture-level conformance window may also be included in the signalling information of the video bitstream for the encoder and/or decoder to improve subpicture processing. Based on such information and processing, multiple subpictures can be decoded as a picture and the subpictures can be outputted by cropping padded regions. Or, one of subpictures can be extracted as a sub-bitstream and decoded as a picture. The decoded picture may be outputted after cropping its padded regions, with the subpicture level conformance window signaling.

Within the context of VVC standard, the conformance window parameters are present in picture parameter set (PPS). The conformance window parameters specify the output picture size and the location. Per picture, one parameter set (conf_win_left_offset, conf_win_right_offset, conf_win_top_offset, and conf_win_bottom_offset) specify a rectangular region specified in picture coordinates for output. However, only specifying a rectangular region may not deal with multiple subpictures for various use cases, such as in a cubemap projection.

Figure 8:
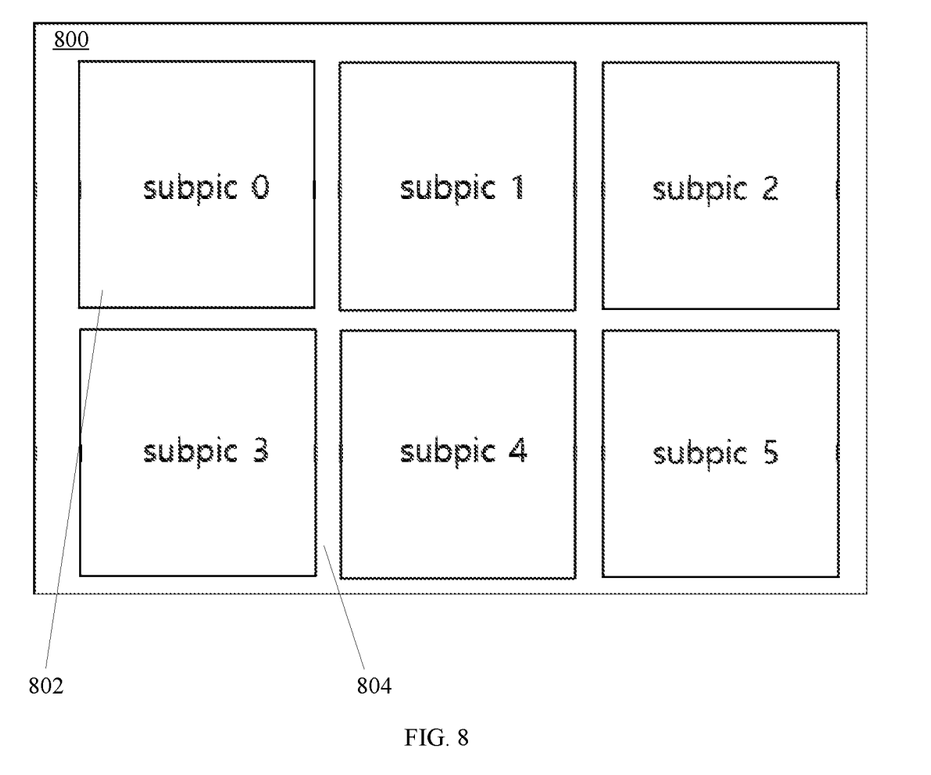
FIG. 8 illustrates exemplary subpictures for padded cubemap projection consistent with embodiments of the present disclosure.

For example, a 360 video can be projected with a cubemap projection. FIG. 8 illustrates an exemplary subpicture conformance window for padded cubemap projection consistent with the disclosed embodiments. Six faces may rearranged onto a picture with padded regions to alleviate the boundary discontinuity. As shown in FIG. 8, the video picture 800 includes six subpictures 802, subpic 0, subpic 1, subpic 2, subpic 3, subpic 4, and subpic 5, and padded regions 804.

That is, the picture can be partitioned into six subpictures, so that each subpicture contains each face with padded regions. There may be two scenario with this coded picture at decorder side. First, all six faces can be decoded as a picture and six subpictures can be outputted by cropping padded regions. Second, one of six subpictures can be extracted as a sub-bitstream and the subpicture in the extracted bitstream can be decoded as a picture. The decoded picture may be outputted after cropping its padded regions. In both scenarios, signaling each conformance window per subpicture may be provided. In one embodiments, it is to signal a conformance window parameter set (subpic_conf_win_left_offset[i], conf_win_right_offset[i], conf_win_top_offset[i], and conf_win_bottom_offset[i]) per subpicture in PPS, when the subpicture partitiong is used in the CVS. Specifically, the table 8 below shows conformance window parameters SEI message syntax.

TABLE 8

| conformance window parameters syntax | |
|---|---|
| | Descriptor |
| pic_parameter_set_rbsp( ) { | |
|   pps_pic_parameter_set_id | ue(v) |
|   pps_seq_parameter_set_id | ue(v) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|     subpic_conformance_window_flag | u(1) |
|     if( subpic_conformance_window_flag ) { | |
|       for( i = 0; i <= max_subpics_minus1; i++ ) { | |
|         subpic_grid_idx_conf_win[ i ] | u(v) |
|         subpic_conf_win_left_offset[ i ] | ue(v) |
|         subpic_conf_win_right_offset[ i ] | ue(v) |
|         subpic_conf_win_top_offset[ i ] | ue(v) |
|         subpic_conf_win_bottom_offset[ i ] | ue(v) |
|       } | |
|     } | |
|   } | |
|   output_flag_present_flag | u(1) |
|   single_tile_in_pic_flag | u(1) |

The parameter pps_pic_parameter_set_id identifies the PPS for reference by other syntax elements. PPS NAL units, regardless of the nuh_layer_id values, share the same value space of pps_pic_parameter_set_id.

The parameter pps_seq_parameter_set_id specifies the value of sps_seq_parameter_set_id for the SPS. The value of pps_seq_parameter_set_id shall be in the range of 0 to 15, inclusive. The value of pps_seq_parameter_set_id shall be the same in all PPSs that are referred to by coded pictures in a CLVS.

The parameters pps_pic_width_in_luma_samples specifies the width of each decoded picture referring to the PPS in units of luma samples. pps_pic_width_in_luma_samples shall not be equal to 0, shall be an integer multiple of Max(8, MinCbSizeY), and shall be less than or equal to sps_pic_width_max_in_luma_samples.

The parameters pps_pic_height_in_luma_samples specifies the height of each decoded picture referring to the PPS in units of luma samples. pps_pic_height_in_luma_samples shall not be equal to 0 and shall be an integer multiple of Max(8, MinCbSizeY), and shall be less than or equal to sps_pic_height_max_in_luma_samples.

The flag subpic_conformance_window_flag equal to 1 indicates that the subpicture conformance cropping window offset parameters follow next in the PPS. conformance_window_flag equal to 0 indicates that the subpicture conformance cropping window offset parameters are not present. It is a requirement of bitstream conformance that, when the value of subpics_present_flag is equal to 0, the value of subpic_conformance_window_flag shall be equal to 0.

The parameters subpic_grid_idx_conf_win[i] specifies the subpicture index of the i-th subpicture conformance window. The length of subpic_grid_idx_conf_win[i] is Ceil (Log 2(max_subpics_minus1+1)) bits.

The parameters subpic_conf_win_left_offset[i], subpic_conf_win_right_offset[i], subpic_conf_win_top_offset[i], and subpic_conf_win_bottom_offset[i] specify the samples of the subpicture with the subpicture index equal to subpic_grid_idx_conf_win[i] in the picture referring to this PPS that are output from the decoding process, in terms of a rectangular region specified in picture coordinates for output. When subpic_conformance_window_flag is equal to 0, the values of subpic_conf_win_left_offset[i], subpic_conf_win_right_offset[i], subpic_conf_win_top_offset[i], and subpic_conf_win_bottom_offset[i] are inferred to be equal to 0.

The conformance cropping window of the subpicture with the subpicture index equal to subpic_grid_idx_conf_win[i] contains the luma samples with horizontal picture coordinates from SubPicLeftPos[SubPicIdx]+SubWidthC*subpic_conf_win_left_offset[i] to SubPicRightPos[SubPicIdx]−(SubWidthC*subpic_conf_win_right_offset[i]+1) and vertical picture coordinates from SubPicTopPos[SubPicIdx]+SubHeightC*subpic_conf_win_top_offset[i] to SubPicBotPos[SubPicIdx]−(SubHeightC*subpic_conf_win_bottom_offset[i]+1), inclusive.

The variables SubPicLeftPos, SubPicTopBoundaryPos, SubPicRightBoundaryPos, and SubPicBotBoundaryPos are derived as follows:

SubPicIdx=subpic_grid_idx_conf_win[$i$]

SubPicLeftPos[SubPicIdx]=SubPicLeft[SubPicIdx]*
(subpic grid col width minus1+1)*4

SubPicRightPos[SubPicIdx]=(SubPicLeft[SubPicIdx]+SubPicWidth[SubPicIdx])*(subpic grid col width minus1+1)*4

SubPicTopPos[SubPicIdx]=SubPicTop[SubPicIdx]*
(subpic_grid_row_height_minus1+1)*4

SubPicBotPos[SubPicIdx]=(SubPicTop[SubPicIdx]+
SubPicHeight[SubPicIdx])*(subpic_grid_row_height_minus1+1)*4

The value of SubWidthC*(subpic_conf_win_left_offset[i]+subpic_conf_win_right_offset[i]) shall be less than (SubPicRightPos[SubPicIdx]−SubPicLeftPos[SubPicIdx]), and the value of SubHeightC*(subpic_conf_win_top_offset[i]+subpic_conf_win_bottom_offset[i]) shall be less than (SubPicBottomPos[SubPicIdx]−SubPicTopPos[SubPicIdx]).

The variables SubPicOutputWidthL[i] and SubPicOutputHeightL[i] are derived as follows:

SubPicOutputWidthL[$i$]=(SubPicRightPos[SubPicIdx]−SubPicLeftPos[SubPicIdx])−SubWidthC*
(subpic_conf_win_right_offset[$i$]+subpic_conf_win_left_offset[$i$])

SubPicOutputHeightL[$i$]=(SubPicTopPos[SubPicIdx]−SubPicLeftPos[SubPicIdx])−SubHeightC*
(subpic_conf_win_bottom_offset[$i$]+subpic_conf_win_top_offset[$i$])

It should be noted that the subpicture conformance cropping window offset parameters may be only applied at the subpicture output. All internal decoding processes may be applied to the uncropped picture size.

In certain embodiments, a subpicture-level output window may also be included in the signalling information of the video bitstream for the encoder and/or decoder to improve subpicture processing. For example, with respect to the example shown in FIG. 8, the subpicture-level output window may be signaled in an SEI message. Specifically, the table 9 below shows subpicture-level output window SEI message syntax.

TABLE 9

Subpicture-level output window SEI message syntax

| | Descriptor |
|---|---|
| sub_pic_output_window( payloadSize ) { | |
|   pic_width_in_luma_samples | ue(v) |
|   pic_height_in_luma_samples | ue(v) |
|   num_subpics_minus1 | ue(v) |
|   subpic_id_len_minus1 | ue(v) |
|   for( i = 0; i <= num_subpics_minus1; i++ ) { | |
|     subpic_id[ i ] | u(v) |
|     subpic_output_flag[ i ] | u(1) |
|     subpic_output_window_flag [ i ] | u(1) |
|     if( subpic_output_window_flag [ i ] ) { | |
|       subpic_conf_win_left_offset[ i ] | ue(v) |
|       subpic_conf_win_right_offset[ i ] | ue(v) |
|       subpic_conf_win_top_offset[ i ] | ue(v) |
|       subpic_conf_win_bottom_offset[ i ] | ue(v) |
|     } | |
|   } | |
| } | |

The parameter pic_width_in_luma_samples specifies the width of each decoded picture of the PU containing this SEI message in units of luma samples. pic_width_in_luma_samples shall not be equal to 0, shall be an integer multiple of Max(8, MinCbSizeY), and shall be less than or equal to pic_width_max_in_luma_samples.

The parameter pic_height_in_luma_samples specifies the height of each decoded picture of the PU containing this SEI message in units of luma samples. pic_height_in_luma_samples shall not be equal to 0 and shall be an integer multiple of Max(8, MinCbSizeY), and shall be less than or equal to pic_height_max_in_luma_samples.

The parameter num_subpics_minus1 plus 1 specifies the number of subpictures of the PU containing this SEI message.

The parameter subpic_id_len_minus1 plus 1 specifies the number of bits used to represent the syntax element subpic_id[i]. The value of subpic_id_len_minus1 shall be in the range of 0 to 15, inclusive Th parameters e subpic_id[i] specifies the subpicture ID of the i-th subpicture. The length of the subpic_id[i] syntax element is subpic_id_len_minus1+1 bits.

The flag subpic_output_flag [i] equal to 1 specifies that the i-th subpicture is outputted. subpic_output_flag [i] equal to 0 specifies that the i-th subpicture is not outputted.

The flag subpic_output_window_flag [i] equal to 1 indicates that the subpicture Output cropping window offset parameters follow next in the SEI message. Output_window_flag equal to 0 indicates that the subpicture Output cropping window offset parameters are not present. It is a requirement of bitstream Output that, when the value of subpics_present_flag is equal to 0, the value of subpic Output_window_flag shall be equal to 0.

The parameters subpic_conf win_left_offset[i], subpic_conf_win_right_offset[i], subpic_conf_win_top_offset[i], and subpic_conf_win_bottom_offset[i] specify the samples of the subpicture with the subpicture index equal to subpic_grid_idx_conf_win[i] in the picture containing this SEI message that are output from the decoding process, in terms of a rectangular region specified in picture coordinates for output. When subpic Output_window_flag is equal to 0, the values of subpic_conf_win_left_offset[i], subpic_conf_win_right_offset[i], subpic_conf_win_top_offset[i], and subpic_conf_win_bottom_offset[i] are inferred to be equal to 0.

The output cropping window of the subpicture with the subpicture index equal to subpic_grid_idx_conf_win[i] contains the luma samples with horizontal picture coordinates from SubPicLeftPos[SubPicIdx]+SubWidthC*subpic_conf_win_left_offset[i] to SubPicRightPos[SubPicIdx]−(SubWidthC*subpic_conf_win_right_offset[i]+1) and vertical picture coordinates from SubPicTopPos[SubPicIdx]+SubHeightC*subpic_conf_win_top_offset[i] to SubPicBotPos[SubPicIdx]−(SubHeightC*subpic_conf_win_bottom_offset[i]+1), inclusive.

The variables SubPicLeftPos, SubPicTopBoundaryPos, SubPicRightBoundaryPos, and SubPicBotBoundaryPos are derived as follows:

SubPicIdx=subpic_grid_idx_conf_win[i]

SubPicLeftPos[SubPicIdx]=SubPicLeft[SubPicIdx]*
(subpic_grid_col_width_minus1+1)*4

SubPicRightPos[SubPicIdx]=(SubPicLeft[SubPicIdx]+SubPicWidth[SubPicIdx])*(subpic_grid_col_width_minus1+1)*4

SubPicTopPos[SubPicIdx]=SubPicTop[SubPicIdx]*
(subpic_grid_row_height_minus1+1)*4

SubPicBotPos[SubPicIdx]=(SubPicTop[SubPicIdx]+SubPicHeight[SubPicIdx])*(subpic_grid_row_height_minus1+1)*4

The value of SubWidthC*(subpic_conf_win_left_offset[i]+subpic_conf_win_right_offset[i]) shall be less than (SubPicRightPos[SubPicIdx]−SubPicLeftPos[SubPicIdx]), and the value of SubHeightC*(subpic_conf_win_top_offset[i]+subpic_conf_win_bottom_offset[i]) shall be less than (SubPicBottomPos[SubPicIdx]-SubPicTopPos[SubPicIdx]).

The variables SubPicOutputWidthL[i] and SubPicOutputHeightL[i] are derived as follows:

SubPicOutputWidthL[i]=(SubPicRightPos[SubPicIdx]−SubPicLeftPos[SubPicIdx])−SubWidthC*
(subpic_conf_win_right_offset[i]+subpic_conf_win_left_offset[i])

SubPicOutputHeightL[i]=(SubPicTopPos[SubPicIdx]−SubPicLeftPos[SubPicIdx])−SubHeightC*
(subpic_conf_win_bottom_offset[i]+subpic_conf_win_top_offset[i])

It should be noted that the subpicture output cropping window offset parameters are only applied at the subpicture output. All internal decoding processes are applied to the uncropped picture size. Further, the table 10 below indicates the persistence scope of nesting SEI messages.

TABLE 10

Persistence scope of SEI messages (informative)

| SEI message | Persistence scope |
|---|---|
| Subpicture output window | The PU containing the SEI message |

Returning to FIG. 4, after the computer system renders the decoded video contents based on the decoded video bitstream and the signaling information (S414), the computer system may present the rendered video contents to a user of the computer system (S416). The computer system may also present the rendered video contents to other programs or applications for further processing, such as image analysis or pattern detection, etc.

By using the disclosed methods and systems, it enables using of a single decoder instance and the single-layer VVC decoding process for decoding multiple independent layers, while it is still possible to decode each independent layer with a separate decoder instance. Further, subpicture-level processing and signaling is significantly improved.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. Thus, the content of the specification should not be construed as a limitation to the present disclosure.

What is claimed is:

1. A video processing method, comprising:
obtaining a plurality of video sources, the plurality of video sources including a first coded region and a second coded region;
encoding a bitstream of the plurality of video sources into a plurality of independent layers, the independent layers including a first independent layer and a second independent layer, wherein the bitstream is encoded by:
encoding a portion of the first coded region into the first independent layer with a first layer ID and a first POC (picture order count) value; and
encoding a portion of the second coded region into the second independent layer with a second layer ID different than the first layer ID and a second POC value different than the first POC value;
generating signaling information on the plurality of independent layers; and
transferring the bitstream along with the signaling information for decoding processing.

2. The video processing method of claim 1, wherein the bitstream is encoded further by:
encoding a second portion of the first encoded region into the first independent layer with the first layer ID but with a third POC value, the third independent layer being different than the first POC value and different than the second POC value.

3. The video processing method of claim 1, wherein the signaling information includes one or more of:
a first parameter, specifying a number of layers in the plurality of independent layers;
a second parameter, specifying that the plurality of independent layers are independently coded; and
a third parameter, specifying that a profile-tier-level and hypothetical-reference-decoder (HRD) parameters apply collectively to the plurality of independent layers.

4. The video processing method of claim 1, wherein the signaling information further includes mapping information to connect the first coded region to the first independent layer and to connect the second coded region to the second independent layer.

5. The video processing method of claim 1, wherein the signaling information further includes:
an offset value (x, y) of a left-top position of at least one of the first and the second independent layer; or
a height or a width of the at least one of the first and the second independent layer.

6. The video processing method of claim 1, wherein the signaling information further includes 4-neighbor (top, right, bottom, and left) information of at least one of the first and the second independent layers.

7. The video processing method of claim 1, wherein the signaling information further includes a parameter, indicating that there is one and only one picture per each POC value along all layers in the plurality of independent layers.

8. A video processing apparatus, comprising: a memory storing computer program instructions; and a processor coupled to the memory and configured to execute the computer program instructions and perform:
obtaining a plurality of video sources, the plurality of video sources including a first coded region and a second coded region;
encoding a bitstream of the plurality of video sources into a plurality of independent layers, the independent layers including a first independent layer and a second independent layer, wherein the bitstream is encoded by:
encoding a portion of the first coded region into the first independent layer with a first layer ID and a first POC (picture order count) value; and
encoding a portion of the second coded region into the second independent layer with a second layer ID different than the first layer ID and a second POC value different than the first POC value;
generating signaling information on the plurality of independent layers; and
transferring the bitstream along with the signaling information for decoding processing.

9. The video processing apparatus of claim 8, wherein the bitstream is encoded further by:
encoding a second portion of the first encoded region into the first independent layer with the first layer ID but with a third POC value, the third independent layer being different than the first POC value and different than the second POC value.

10. The video processing apparatus of claim 8, wherein the signaling information includes one or more of:
a first parameter, specifying a number of layers in the plurality of independent layers;
a second parameter, specifying that the plurality of independent layers are independently coded; and
a third parameter, specifying that a profile-tier-level and hypothetical-reference-decoder (HRD) parameters apply collectively to the plurality of independent layers.

11. The video processing apparatus of claim 8, wherein the signaling information further includes mapping information to connect the first coded region to the first independent layer and to connect the second coded region to the second independent layer.

12. The video processing apparatus of claim 8, wherein the signaling information further includes:
an offset value (x, y) of a left-top position of at least one of the first and the second independent layer; or
a height or a width of the at least one of the first and the second independent layer.

13. The video processing apparatus of claim 8, wherein the signaling information further includes 4-neighbor (top, right, bottom, and left) information of at least one of the first and the second independent layers.

14. The video processing apparatus of claim 8, wherein the signaling information further includes a parameter, indicating that there is one and only one picture per each POC value along all layers in the plurality of independent layers.

15. A non-transitory computer-readable storage medium storing computer program instructions executable by at least one processor to perform:
obtaining a plurality of video sources, the plurality of video sources including a first coded region and a second coded region;

encoding a bitstream of the plurality of video sources into a plurality of independent layers, the independent layers including a first independent layer and a second independent layer, wherein the bitstream is encoded by:
  encoding a portion of the first coded region into the first independent layer with a first layer ID and a first POC (picture order count) value; and
  encoding a portion of the second coded region into the second independent layer with a second layer ID different than the first layer ID and a second POC value different than the first POC value;
generating signaling information on the plurality of independent layers; and
transferring the bitstream along with the signaling information for decoding processing.

16. The non-transitory computer-readable storage medium of claim 14, wherein the bitstream is encoded further by:
  encoding a second portion of the first encoded region into the first independent layer with the first layer ID but with a third POC value, the third independent layer being different than the first POC value and different than the second POC value.

17. The non-transitory computer-readable storage medium of claim 14, wherein the signaling information includes one or more of:
  a first parameter, specifying a number of layers in the plurality of independent layers;
  a second parameter, specifying that the plurality of independent layers are independently coded; and
  a third parameter, specifying that a profile-tier-level and hypothetical-reference-decoder (HRD) parameters apply collectively to the plurality of independent layers.

18. The non-transitory computer-readable storage medium of claim 14, wherein the signaling information further includes mapping information to connect the first coded region to the first independent layer and to connect the second coded region to the second independent layer.

19. The non-transitory computer-readable storage medium of claim 14, wherein the signaling information further includes:
  an offset value (x, y) of a left-top position of at least one of the first and the second independent layer; or
  a height or a width of the at least one of the first and the second independent layer.

20. The non-transitory computer-readable storage medium of claim 14, wherein the signaling information further includes 4-neighbor (top, right, bottom, and left) information of at least one of the first and the second independent layers.

* * * * *